United States Patent [19]

Kemp

[11] Patent Number: 5,501,178
[45] Date of Patent: Mar. 26, 1996

[54] PET WATERING APPARATUS WITH FLOWING WATER TO SIMULATE A MOUNTAIN CREEK

[76] Inventor: Kay G. Kemp, 1504 Carolyn Dr., Orange, Tex. 77632

[21] Appl. No.: 504,275

[22] Filed: Jul. 19, 1995

[51] Int. Cl.⁶ ........................................ A01K 7/00
[52] U.S. Cl. ................ 119/74; 239/17; 119/255; D30/132
[58] Field of Search ............... 119/74, 61, 51.5, 119/255, 69.5, 81; 239/17, 18, 23; D23/201; D30/132

[56] References Cited

U.S. PATENT DOCUMENTS

| D. 315,037 | 2/1991 | Clark | D30/132 |
| D. 343,442 | 1/1994 | Cooper | D23/201 |
| 3,901,439 | 8/1975 | Willis | 239/12 |
| 4,836,142 | 6/1989 | Duback | 119/255 |
| 5,167,368 | 12/1992 | Nash | 239/17 |

*Primary Examiner*—Robert P. Swiatek
*Assistant Examiner*—Elizabeth Shaw
*Attorney, Agent, or Firm*—Donald A. Kettlestrings

[57] ABSTRACT

Pet watering apparatus provides flowing water to simulate a mountain creek. A simulated rock formation representing a mountain creek defines a series of descending depressions and ledges to create descending pools and waterfalls connected by a flowing stream when water is supplied to the formation. A simulated rock is positioned within an uppermost one of the depressions and is internally configured for controlling flow of water provided by a pump via a hollow conduit from a water container to the uppermost depression.

13 Claims, 2 Drawing Sheets

PET WATERING APPARATUS WITH FLOWING WATER TO SIMULATE A MOUNTAIN CREEK

BACKGROUND OF THE INVENTION

This application relates to pet watering apparatus and more particularly to pet watering apparatus with flowing water to simulate a mountain creek.

Many animals, especially cats, like to drink from moving water and to play with moving water. Those pets attracted to moving water will prefer to drink out of faucets in the bathroom or kitchen or from commodes in the bathroom despite having a clean bowl of still water available.

It is, therefore, an object of the present invention to provide pet watering apparatus with flowing water.

Another object is to provide such apparatus which is aesthetically pleasing to the human eye and which simulates a mountain creek.

A further object of the invention is the provision of such apparatus which includes means for manually controlling flow of water within the apparatus.

Still another object is to provide such apparatus which uses a pump to recirculate water through the apparatus so that the flowing water attracts animals with its noise and motion.

Yet another object of the present invention is the provision of such apparatus which provides a series of pools, waterfalls and a stream for giving the pet the option of drinking from several types of water.

A still further object is to provide such apparatus having flowing water which creates a psychologically calming effect for house-bound pets.

Another object is to provide such apparatus having flowing water to relieve boredom for house-bound pets.

Another object is to provide such apparatus for attracting animals with the noise and motion of flowing water.

Still another object is to provide such apparatus which promotes hygiene by encouraging pets to drink from the flowing water of the apparatus instead of from faucets or toilet bowls.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides pet watering apparatus, comprising: a container for holding water; a simulated rock formation representing a mountain creek and defining a series of descending depressions and ledges to create descending pools and waterfalls connected by a flowing stream when water is supplied to the formation; the formation defining a hollow interior of predetermined size and configuration for receiving the container within the hollow interior; a pump positioned within the container for receiving water from the container; a hollow conduit connecting the pump to a predetermined upper one of the depressions for elevating water from the pump to the upper depression; a predetermined lower one of the depressions defining a drain opening therein in liquid communication with the container; and means in operative relationship with the conduit and with the upper depression for controlling flow of water from the pump to the upper depression and thereby to the descending pools and waterfalls and to the stream.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate an example of a preferred embodiment of the invention and, together with the description, serve to explain the principles of the invention.

DESCRIPTION OF THE PREFERRED EMBODIMENT

Figure 1:
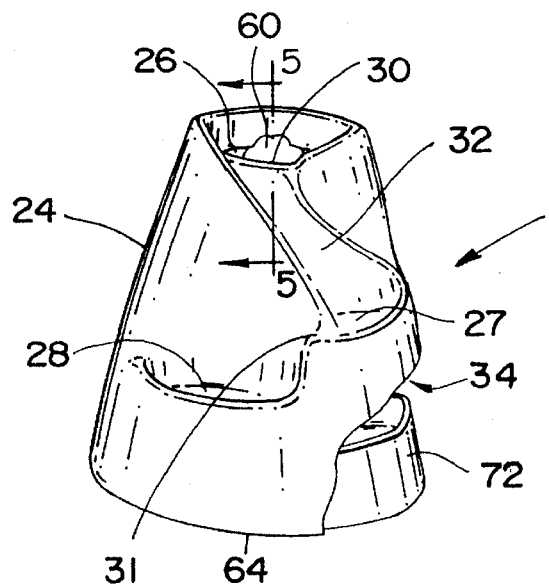
FIG. 1 is a front elevation view showing the apparatus.
Figure 2:
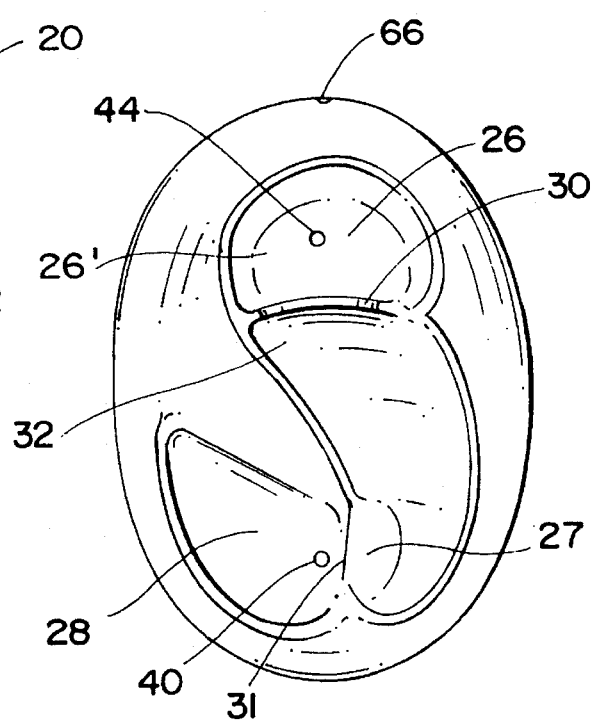
FIG. 2 is a top plan view of the apparatus with the simulated rock removed from the upper depression.
Figure 3:
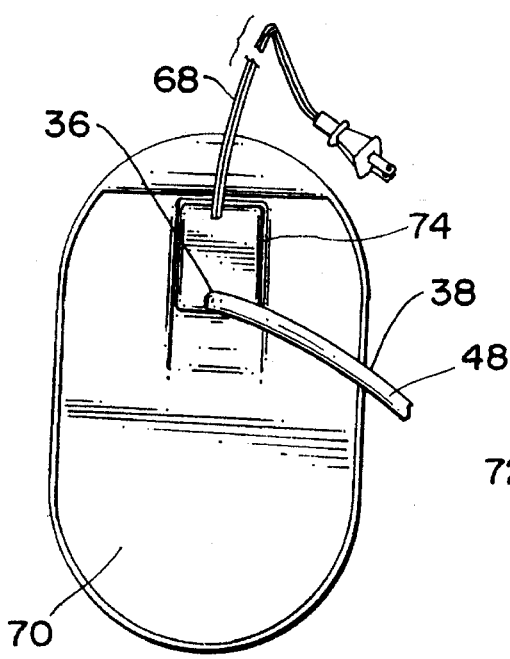
FIG. 3 is a fragmentary top plan view showing the apparatus container and the pump positioned within the container.
Figure 4:
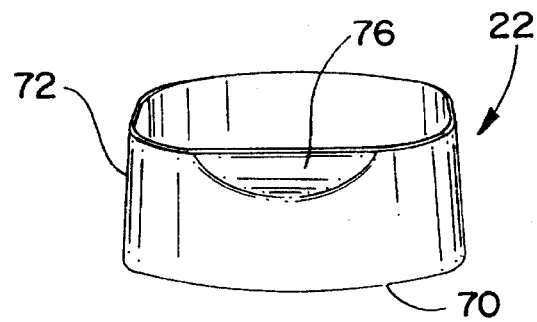
FIG. 4 is a rear elevation view of the container.

With reference now to the drawings, wherein like reference characters designate like or corresponding parts throughout the several views, there is shown pet watering apparatus 20 which comprises a container 22 for holding water. Apparatus 20 also includes a simulated rock formation 24 representing a mountain creek and defining a series of descending depressions 26, 27 and 28 and ledges 30, 31 to create descending pools and waterfalls connected by a flowing stream through channel 32 when water is supplied to formation 24.

Formation 24 defines a hollow interior 34 of predetermined size and configuration for receiving container 22 within hollow interior 34. A pump 36 is positioned within container 22 for receiving water from the container, and a hollow conduit 38 connects pump 36 to a predetermined upper one 26 of the depressions for elevating water from pump 36 to upper depression 26.

A predetermined lower one 28 of the depressions defines a drain opening 40 therein in liquid communication with container 22 when container 22 is positioned within hollow interior 34 of formation 24.

Means generally indicated at 42 are provided in operative relationship with conduit 38 and with upper depression 26 for controlling flow of water from pump 36 to upper depression 26 and thereby to the descending pools and waterfalls and to the stream of formation 24.

Upper depression 26 defines a surface 26' with a supply opening 44 defined within surface 26', and conduit 38 is positioned within and extends through supply opening 44. Conduit 38 preferably comprises an open-ended, hollow, rigid connector tube 46 which defines a central longitudinal axis and which is positioned within and extends through supply opening 44. Conduit 38 further includes an open-ended, hollow, flexible tubing 48 which is connected in a conventional manner between tube 46 and pump 36.

Figure 5:
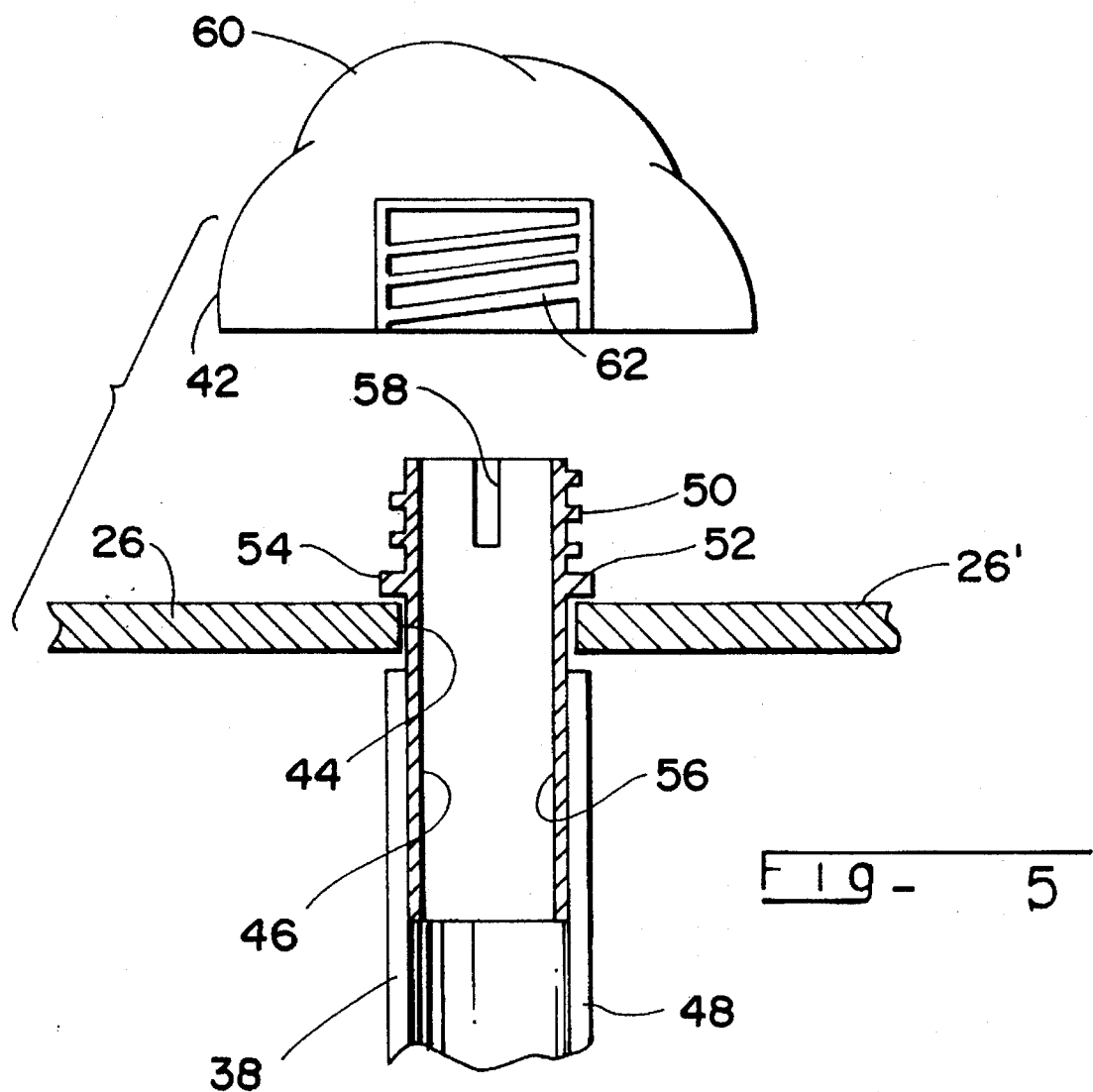
FIG. 5 is a fragmentary cross-sectional view taken along the line 5—5 in FIG. 1 and looking in the direction of the arrows.

Connector tube 46 defines an externally threaded first end 50 and includes means 52 for holding tube 46 in position within supply opening 44. Holding means 52 preferably includes a circumferential flange 54 attached to connector tube 46 for engaging surface 26' of upper depression 26. This is best seen in FIG. 5. Tube 46 is vertically positioned with flange 54 resting on surface 26' to support tube 46. Adhesive can be used to adhere flange 54 more securely to surface 26'.

Connector tube 46 defines a cylindrical wall 56 and further defines a plurality of openings 58 which extend through wall 56 at first end 50 of tube 46 and which are circumferentially spaced around wall 56.

Water flow controlling means 42 preferably include a simulated rock 60 which defines an interior threaded cavity 62 for threadably engaging threaded first end 50 of connector tube 46. Interior threaded cavity 62 can be an insert positioned and held within simulated rock 60. Simulated rock 60 is sized and configured to fit within upper depression 26 in a visually natural and aesthetically pleasing manner. Each of openings 58 is preferably an elongated slot which is aligned in parallel relationship with the longitudinal axis of connector tube 46.

Formation 24 defines a lower edge 64 for normally supporting formation 24 on a flat, horizontal surface, such as a floor or table. A hole 66 is provided within formation 24 and contiguous with lower edge 64 for passing an electrical power cord 68 to pump 36 through hole 66. This allows formation 24 to rest in a stable manner on edge 64 without resting on power cord 68.

The size and configuration of hollow interior 34 of formation 24 enables the formation to cover and to hide container 22 from view when formation 24 is placed over container 22 with lower edge 64 supporting formation 24 on a flat, horizontal surface.

Container 22 defines a bottom 70 and a sidewall 72 extending upwardly from bottom 70. Bottom 70 defines a cavity 74 therein for receiving pump 36, and bottom 70 and cavity 74 are contoured so that water within container 22 will naturally drain into cavity 74 to be drawn into pump 36 when the pump is activated.

Sidewall 72 preferably defines an inwardly slanted portion 76 for supporting electrical power cord 68 to pump 36 as the power cord rests on and extends over sidewall 72.

In operation and use, container 22 is filled with water to a desired level with pump 36 positioned within container cavity 74. Electrical power cord 68 for pump 36 is positioned over a top edge of sidewall 72 with cord 68 resting on slanted part 76 of the sidewall. Slanted part 76 of sidewall 72 avoids the necessity for severely bending power cord 68.

Formation 24 is then positioned over and around container 22 with container 22 within hollow interior 34 and with lower edge 64 resting on a conventional flat surface, such as a floor or table. Cord 68 is positioned within hole 66 at lower edge 64 of formation 24 so that lower edge 64 does not rest upon cord 68. This enables formation 24 to rest in a stable manner on edge 64.

Power cord 68 is then plugged into a conventional electrical outlet (not shown) to supply electrical power to submersible pump 36. Energization of the pump causes water from container 22 to be drawn into pump 36, and the pump then elevates the water through flexible tubing 48 and through connector tube 46. The water then passes through openings 58 in connector tube 46 and into upper depression 26. The continued supply of water to upper depression 26 results in filling of upper depression 26 to a level even with upper ledge 30 so that water will then flow over upper ledge 30 and downwardly through channel 32 into intermediate depression 27. Depression 27 will then be filled to a level even with lower ledge 31, and water will then overflow lower ledge 31 to flow into lower depression 28.

The water will then rise within lower depression 28 until it reaches a level even with drain opening 40. The water will then drain through opening 40 and downwardly into open-top container 22. This circulation of water will continue as long as pump 36 is activated to provide a series of descending pools, waterfalls and a stream for giving a pet the option of drinking from several types of water. It should be understood that various numbers and configurations of pools, waterfalls and streams can be used in formation 24.

An important feature of the invention is the use of simulated rock 60 in cooperation with connector tube 46 and with openings 58 to control the flow of water. The water flow can be reduced by manually screwing simulated rock 60 downwardly onto connector tube 46 to reduce the size of openings 58 through which the water passes. Conversely, water flow can be increased by manually loosening simulated rock 60 by unscrewing the rock with respect to connector tube 46. This will increase the size of openings 58 through which water is permitted to flow, and the flow of water will be increased.

Stones or small rocks (not shown) can be placed in various locations within depressions 26, 27 and 28 and adjacent to ledges 30, 31 to change the sound, flow or turbulence of the water. The positions of these stones or rocks can be changed by the user to create various types of sounds, flows and turbulence. Various artifacts to simulate vegetation, trees, etc. (not shown) can be added or attached to formation 24 to increase the attractiveness of the apparatus for human appreciation.

Container 22 and formation 24 are preferably formed from a water-resistant plastic material. Filters, ion exchange or carbon canisters (not shown) can be inserted into tubing 48 exiting pump 36 to continuously filter and clean the water. Pump 36 can be powered by either household A.C. electricity or by batteries. A ground fault circuit interrupter (not shown) can also be added for electrical safety.

The invention in its broader aspects is not limited to the specific details shown and described, and departures may be made from such details without departing from the principles of the invention and without sacrificing its chief advantages.

What is claimed is:

1. Pet watering apparatus, comprising:

a container for holding water;

a simulated rock formation representing a mountain creek and defining a series of descending depressions and ledges to create descending pools and waterfalls connected by a flowing stream when water is supplied to said formation;

said formation defining a hollow interior of predetermined size and configuration for receiving said container within said hollow interior;

a pump positioned within said container for receiving water from said container;

a hollow conduit connecting said pump to a predetermined upper one of said depressions for elevating water from said pump to said upper depression;

a predetermined lower one of said depressions defining a drain opening therein in liquid communication with said container; and means in operative relationship with said conduit and with said upper depression for controlling flow of water from said pump to said upper depression and thereby to said descending pools and waterfalls and to said stream.

2. Apparatus as in claim 1 wherein said upper depression defines a surface with a supply opening defined within said surface, and wherein said conduit is positioned within and extends through said supply opening.

3. Apparatus as in claim 2 wherein said conduit comprises: an open-ended, hollow connector tube defining a central longitudinal axis and positioned within and extending through said supply opening, and open-ended, hollow tubing connected between said connector tube and said pump.

4. Apparatus as in claim 3 wherein said connector tube defines an externally threaded first end and includes means for holding said connector tube in position within said supply opening.

5. Apparatus as in claim 4 wherein said holding means include a circumferential flange attached to said connector tube for engaging said surface of said upper depression.

6. Apparatus as in claim 5 wherein said connector tube defines a substantially cylindrical wall and further defines a plurality of openings extending through said wall at said first end of said connector tube.

7. Apparatus as in claim 6 wherein said water flow controlling means include a simulated rock defining an interior threaded cavity for threadably engaging said threaded first end of said connector tube, said simulated rock sized to fit within said upper depression.

8. Apparatus as in claim 7 wherein said plurality of openings within said connector tube are each elongated slots aligned substantially in parallel relationship with said longitudinal axis.

9. Apparatus as in claim 1 wherein said formation defines a lower edge for normally supporting said formation on a substantially flat, horizontal surface.

10. Apparatus as in claim 9 wherein said predetermined size and configuration of said hollow interior of said formation enables said formation to cover and to hide said container from view when said formation is placed over said container with said lower edge supporting said formation on a substantially flat, horizontal surface.

11. Apparatus as in claim 10 wherein said container defines a bottom and a sidewall extending upwardly from said bottom, said bottom defining a cavity therein for receiving said pump.

12. Apparatus as in claim 11 wherein said sidewall defines an inwardly slanted portion for supporting an electrical power cord to said pump.

13. Apparatus as in claim 12 wherein said formation defines a hole contiguous with said lower edge for passing an electrical power cord to said pump therethrough.

* * * * *